United States Patent [19]

Haskell et al.

[11] 4,139,862

[45] Feb. 13, 1979

[54] INTERACTIVE COLOR DISPLAY FOR MULTISPECTRAL IMAGERY USING CORRELATION CLUSTERING

[76] Inventors: Robert A. Frosch, Administrator of the National Aeronautics and Space Administration, with respect to an invention of Richard E. Haskell, Rochester, Mich.

[21] Appl. No.: 831,631

[22] Filed: Sep. 8, 1977

[51] Int. Cl.$^2$ .............................. H04N 9/535
[52] U.S. Cl. ..................... 358/81; 358/109; 364/713
[58] Field of Search ............ 358/81, 82, 109; 364/713

[56] References Cited

U.S. PATENT DOCUMENTS 3,806,633   4/1974   Coleman ........................... 358/81

*Primary Examiner*—Robert L. Richardson
*Attorney, Agent, or Firm*—Marvin J. Marnock; John R. Manning; Marvin F. Matthews

[57] ABSTRACT

A method of and apparatus for processing multispectral data is provided and which permits an operator to make parameter level changes during the processing of the data. The system is directed to production of a color classification map on a video display in which a given color represents a localized region in multispectral feature space. Interactive controls permit an operator to alter the size and change the location of these regions, permitting the classification of such region to be changed from a broad to a narrow classification.

31 Claims, 7 Drawing Figures

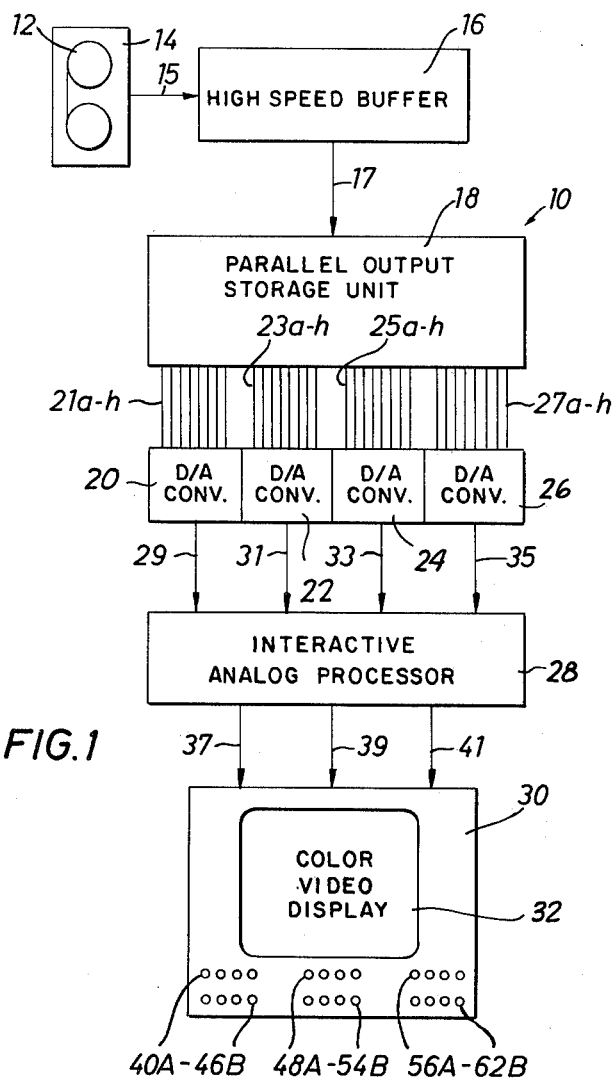
FIG.1
FIG.2
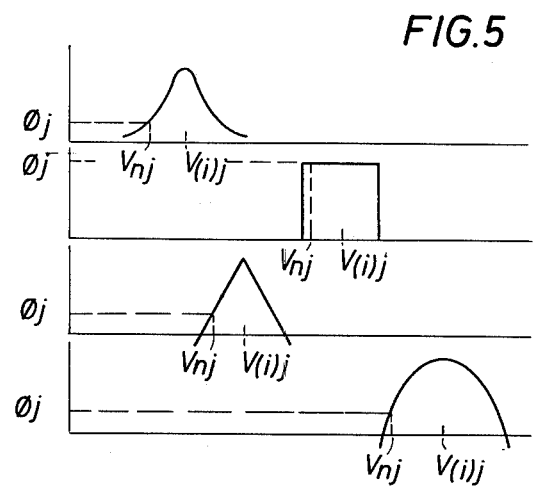
FIG.5
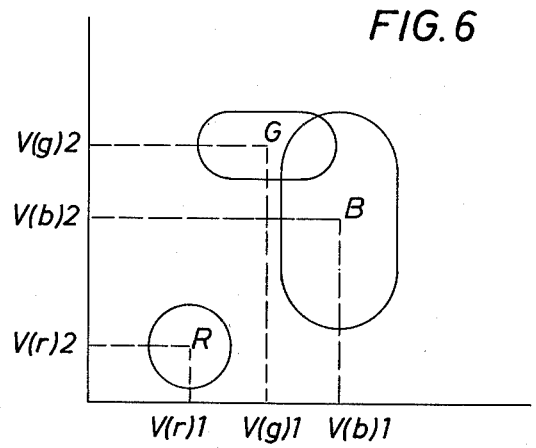
FIG.6

INTERACTIVE COLOR DISPLAY FOR MULTISPECTRAL IMAGERY USING CORRELATION CLUSTERING

ORIGIN OF THE INVENTION

The invention described herein was made in the performance of work under a NASA contract and is subject to the provisions of Section 305 of the National Aeronautics Space Act of 1958, Public Law 85-568 (72 Stat. 435; 45 USC 2457).

FIELD OF THE INVENTION

The present invention relates to a method of and an apparatus for producing single-class and multi-class composite classification maps from multispectral data and in particular, relates to a method of and an apparatus for interactively changing classification level parameters in real time during processing of multispectral scanner data.

BACKGROUND OF THE INVENTION

In ever increasing numbers, aircraft and satellites are being equipped with multispectral scanners used to gather earth resource data. To increase the accuracy of this data, the number of spectral channels included in the scanners has increased, from the 4-channel scanner on the ERTS-1 satellite, through the 13-channel scanner on Skylab, to the Bendix Corporation's 24-channel scanner in numerous aircraft. As the number of scanners in use increases and the number of channels per scanner increases, multispectral data is being generated in increasing quantities. As the amount of data generated increases, the problems associated with processing the data in order to derive meaningful information therefrom also increase.

In the prior art, two distinct but complementary approaches to the processing of multispectral scanner data have been followed. One such approach to such processing uses a variety of techniques to produce color maps of the ground area that are suitable for visual inspection and interpretation. One such technique is to use the intensity of one primary color (red, green, or blue) to represent the intensity of the reflected energy in one of three spectral channels. If these three-color images are superimposed (either photographically or with a color video system) then a full color map is obtained.

There are a number of limitations to the color maps produced in this manner. First of all, since one color is associated with one particular spectral channel of the data it is difficult to produce a map that uses data from more than three different spectral channels. On the other hand, multispectral scanners with up to 24 spectral channels have been built. Further, if one uses data from multiple-passes of the 4-channel ERTS multispectral scanner, then 8, 12 or 16 effective channels of data would not be uncommon.

A second approach to processing multispectral scanner data focuses on digital processing techniques and attempts to classify each ground resolution element in a given area. One such technique attempts to classify each ground resolution element based on some type of pattern recognition algorithm. Such algorithms will require ground truth information in order to train the classifier. Obtaining good ground truth information is one of the most difficult and costly parts of the classification process. Further, a parametric classification technique is generally used in which statistical parameters such as mean vectors and covariance matrices are estimated from ground truth information with the degree to which these estimates reflect the true statistics determining the operating performance of the classification method. However, the resultant difficulty in obtaining good estimates of these parameters when the number of channels increases indicates that the classification accuracy tends to deteriorate when more spectral data is used. Thus, the additional spectral information, which should increase the class discrimination, is not effectively used in parametric classification techniques.

To overcome the obvious disadvantages of the pattern recognition method of processing the data and include information from more than three channels, a number of digital processing techniques, including various clustering methods, such as correlation clustering, have been developed. The correlation clustering method is based on the assumption (implicit in all uses of multraspectral scanner data for classification purposes) that ground resolution elements with the same (or nearly the same) spectral signatures will belong to the same class. Starting with this assumption, those ground resolution elements with similar spectral signatures can be assigned parameters grouping them together into clusters which may then be processed to produce color maps by the use of display systems such as NASA's PMISDAS system at the Johnson Space Center in Houston.

A disadvantage of this type of approach is that the processing is done blindly. That is, the parameter selection and processing are done without being able to see what the resulting color map will look like. Having seen a map produced by initial selection of parameters, the classifier will most likely wish to change these parameters. This requires more off-line digital processing. It is not uncommon for such an iterative approach to take many days or weeks to produce an "ideal" color map of a given area.

It becomes apparent that, in order to reduce the processing time required to produce acceptable classification maps, an interactive system which will allow the operator to change the various parameters in real time is desirable. Such an interactive system would permit extraction of the maximum amount of information from the multispectral data in a minimum amount of time.

Further, such an interactive color display that is to operate in real time would preferably utilize a video display system. Assuming a 500 × 500 picture element (pixel) matrix video display that must be refreshed every 1/30 second, one sees that a 3.75 MHz data rate is required to refresh the video display. Such systems are available and in use today. However, existing systems will simply display a single image and do not process the multispectral data in any way.

What is desired is to be able to change the correlation parameters in "real-time" as observed by the operator. Suppose one tries to do this digitally. Assume that the calculation of a single parameter value requires only 5 basic operations, each taking 1 $\mu$sec. For ERTS data this calculation must be done for each of the four channels and the results added (assume 1 $\mu$sec per addition) to obtain the correlation parameter of a single pixel. Thus, it would take 23 $\mu$sec to compute the correlation parameter from the spectral signature for each of the three colors. Therefore, each of the 250,000 pixels contained in a 500 × 500 pixel display would require 69 $\mu$sec of computation which means that it would take over 17 sec. to change the video picture. This is obviously not the real-time operation that is desired.

The basic problem with digital computations is that there are too many pixels (250,000) and one can therefore afford to spend only about 1 μsec to process each pixel if the entire calculation is to be completed in some fraction of a sec. This suggests that a substantial amount of parallel processing must be done if real time operation is to be achieved. Although digital computers with substantial parallel processing capabilities have been designed and built (such as the ILLIAC IV), they would not be suitable for use in the small type of dedicated system envisioned here.

Alternatively, optical processing offers the ultimate in parallel processing. In U.S. Pat. No. 3,984,671, entitled "Optical Process for Producing Classification Maps from Multispectral Data", a method is suggested by which holographic correlation techniques could be used to produce classification maps. In such a system all of the ground resolution elements are processed simultaneously at the speed of light. However, a real-time system would require a real time input transducer capable of changing coded data for all ground resolution elements at video rates as well as a real time medium for recording the holographic filters. While a number of such real-time devices and recording media are being developed in various laboratories, none at the present time possesses all of the properties that would be required for the type of interactive system disclosed in the present invention. Additionally, in order to make a color display it would be necessary to construct an elaborate system containing lasers of three different colors. Such an interactive real-time system using coherent optical processing is, at present, beyond the current state of the art.

The disadvantages of the prior art are overcome with the present invention, wherein a method and an apparatus are provided for producing color displays of multispectral imagery and which allow an operator to change parameters of the clusters (i.e., classification level changes) in an interactive, real-time manner.

SUMMARY OF THE INVENTION

According to the present invention, method and apparatus are provided for processing multispectral scanner data in real-time to develop a color video display classification map. The multispectral signature or reflectance of a ground resolution element contained in N channels of spectral data, is converted from a digital format to N analog voltage signals. The N analog voltages are coupled into each of three processing circuits, each circuit containing N parallel processor channels. A reference signature voltage having a preselected waveshape and defining a correlation cluster center is developed in each of the N parallel processor channels and algebraically combined with one of the N analog voltage signals. The resultant voltages of each of the N parallel channels in each processing circuit are summed to develop a color-gun drive voltage signal. Each of the three color-gun drive voltage signals are coupled to one of the color-guns of a color video display to provide a three-color representation, in the form of a picture element (pixel) on the video screen, functionally related to the spectral signature of each ground resolution element.

Each of the N parallel processor channels is provided with a first interactive control which allows real-time changes in the cluster center of each channel and with a second interactive control which allows real-time expansion and contraction of the upper and lower limits or bandwidth about each cluster center.

By storing the serially recorded N spectral channels of multispectral data in a parallel-output, multi-track, fixed head disk, the N channels of spectral data may be processed simultaneously for display. Further, the operator, through use of the interactive controls, may change the classification parameter of each of the N channels of data to correlate ground resolution elements having similar spectral signatures. This allows the operator to define and "highlight" areas of particular interest contained within the multispectral data.

Accordingly, it is a feature of the present invention to provide reductions in processing time by permitting an operator to make classification parameter changes during processing and in real-time.

It is another feature of the present invention to provide interactive controls which permit an operator to change levels of classification during a single processing pass.

It is still another feature of the present invention to permit processing of N channels of multispectral data simultaneously.

These and other important features and advantages of the present invention will become apparent from the following detailed description wherein reference is made to the figures in the accompanying drawings showing preferred embodiments of the present invention.

BRIEF DESCRIPTION OF THE DRAWINGS

In order that the manner in which the above-recited features and advantages can be understood in detail, a more particular description of the invention may be had by reference to the specific embodiment thereof which is illustrated in the appended drawings, which drawings form a part of this specification. It is to be noted, however, that the appended drawings illustrate only a typical embodiment of the invention and therefore are not to be considered limiting of its scope for the invention may admit to other equally effective embodiments.

IN THE DRAWINGS

FIG. 1 is a block diagram of a color display system for multispectral imagery incorporating the processing system of the present invention.

FIG. 2 is a block diagram of the interactive analog processor depicted in FIG. 1 and showing multiple spectral inputs into three groups of identical processor circuits used to develop video color-gun drive signals.

Figure 3:
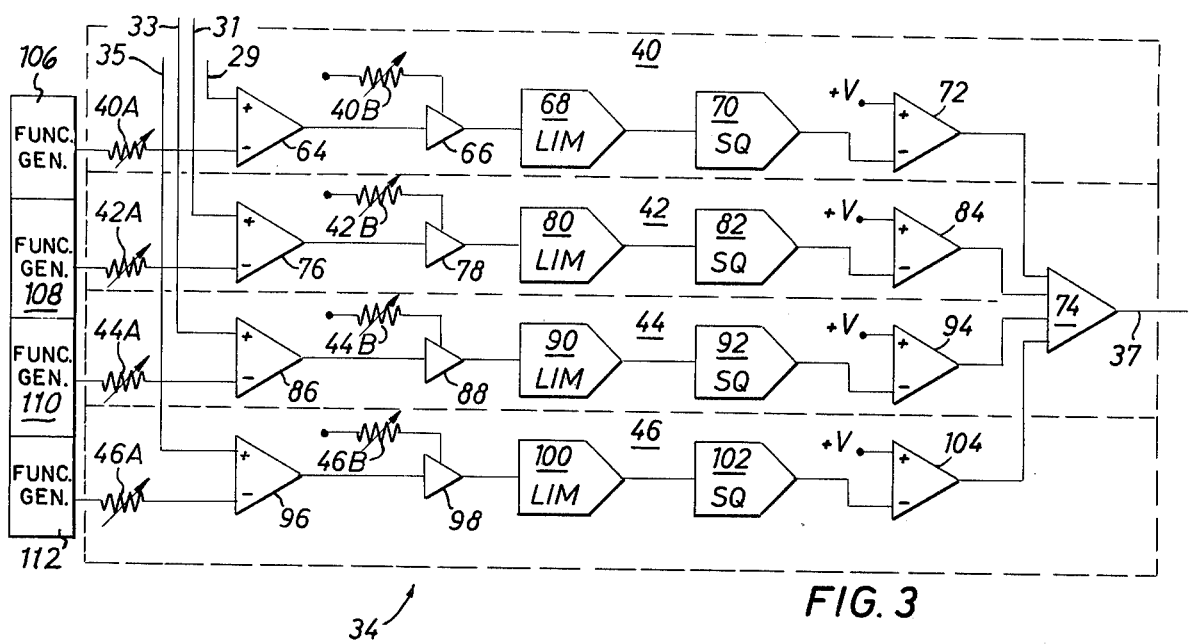

FIG. 3 is a block diagram of the parallel color channels contained within a typical processor circuit of the interactive analog processor depicted in FIG. 2.

Figure 4:
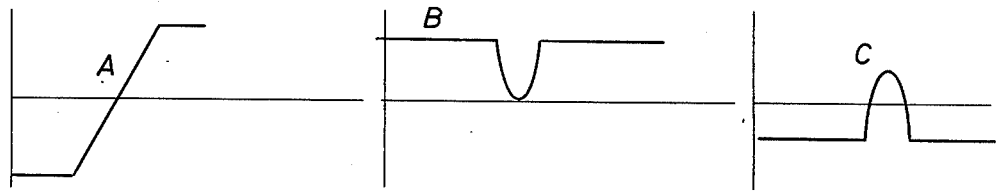

FIGS. 4 A–C depict various wave shapes present at preselected points in the typical parallel color channel depicted in FIG. 3.

FIGS. 5 A–D are representations of preselected reference wave shapes used to cluster the spectral signatures in the parallel circuits of FIG. 3.

FIG. 6 is a representation of the regions of influence developed by intersecting two of the reference wave shapes depicted in FIG. 5.

Figure 7:
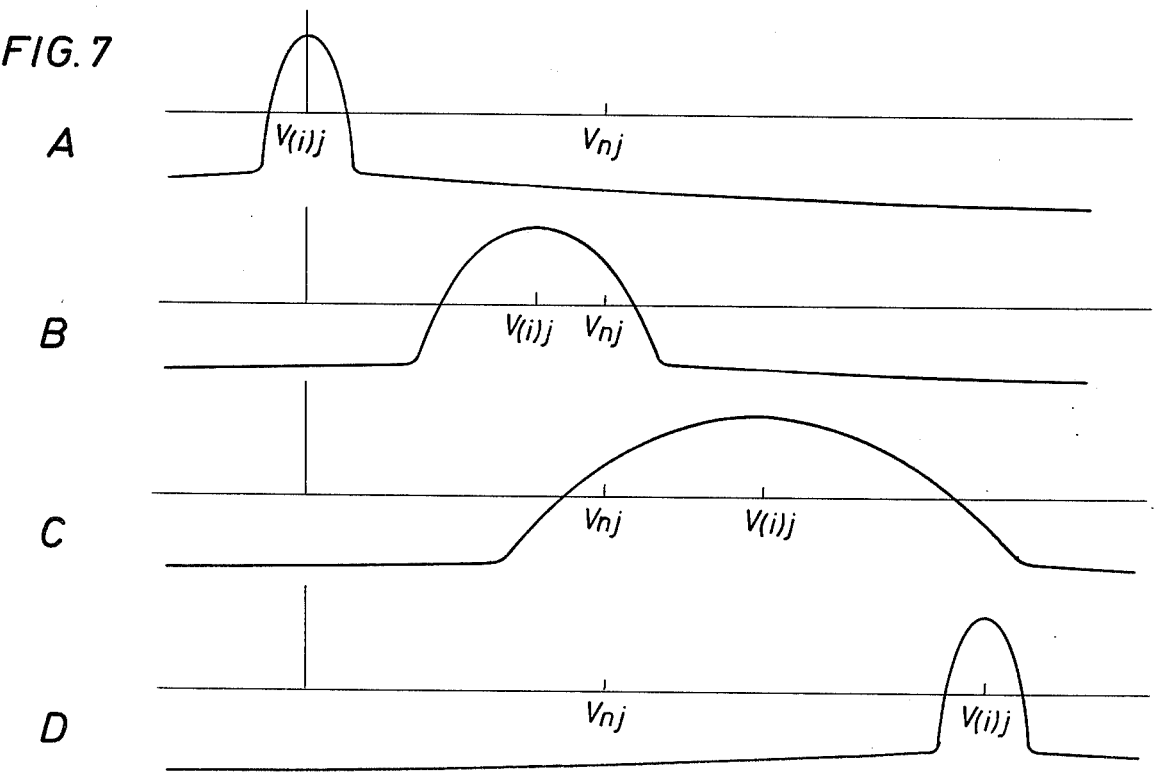

FIGS. 7 A–D are representations of the shift in classification levels by interactive operation of the controls depicted in FIGS. 2 and 3.

DETAILED DESCRIPTION OF THE PREFERRED EMBODIMENTS

Referring now to FIG. 1, there is shown a block diagram of one embodiment of the interactive color display system 10 of the present invention. Although depicted as a four channel system in the drawings, the display system 10 can process any number of channels of multispectral data to produce color classification maps and will allow an operator to interact with the data flow from all channels during processing to change classification parameter levels during such map production.

In order to understand the operation of the system and the processing steps involved, it is helpful first to consider the original format of the multispectral data. First, an airborne spectral scanner (not shown) measures and records the reflectance from a particular ground resolution element simultaneously for each of N different spectral bandwidths. The reflectance measurement of a single ground resolution element is thus divided into N separate spectral channels, and each of the measurements in the N channels is typically quantized as an integer.

The scanner sequentially scans a line of contiguous resolution elements, called a scan line, and records N channels of data for each resolution element that is scanned. The scanning is done perpendicular to the line of flight of the scanner and a recording of successive scan-lines produces data for all ground resolution elements that are in the flight path.

In order to present the information contained in N channels of multispectral scanner data in a form that is readily understood by an observer it is advantageous to use a video color display to represent the multi-dimensional information contained therein, with each picture element (pixel) on the display functionally related by color to the multispectral signature of a given ground resolution element. In particular, the present invention provides a method and apparatus for associating a given ground resolution element with a particular localized region in N dimensional feature space and with the size of a particular localized region and the color associated with it under the interactive control of an operator.

The above-described association requires that the color "c" of each localized region be some combination of the three primary colors — red, r; green, g; and blue, b — such that:

$$c = C_R r + C_G g + C_B b \qquad (1)$$

where $C_R$, $C_G$, and $C_B$ are the proportions of red, green and blue, respectively, which make up the given shade of color "c" associated with a particular region. Thus, for an embodiment of the present invention which uses a color video display to visually present the classification map, $C_R$, $C_G$ and $C_B$ will be the drive voltages developed and applied to the red, green and blue color-guns, respectively, which are associated with a typical color cathode ray tube (CRT) 32.

The present invention provides method and apparatus for developing the values of $C_R$, $C_G$ and $C_B$ from the multispectral data contained on computer compatible tape 12 by the following correlation clustering method. Let $V_T$ define an analog voltage functionally representative of the N-channel multispectral signature associated with a particular ground resolution element and $V_n$ define an analog voltage functionally representative of one of N spectral bands which make up the spectral signature of that resolution element. That is, $V_T = (V_1, V_2, \ldots V_n)$. Next, let $V_I$ define an analog voltage functionally representative of a reference spectral signature associated with a particular color, i.e., $I = r, g,$ or $b$ and let $V_{(i)}$ define an analog voltage having a preselected wave-shape which defines a color center for each of N spectral channels. Next, a weighting function may be defined as $\phi_j (V_{nj} - V_{(i)j})$ which is associated with a particular channel "j" whose value is a maximum at $V_{nj} = V_{(i)j}$ and whose value becomes small as $|V_{nj} - V_{(i)j}|$ increases.

A correlation function $C_i$ associated with the color i ($i=R, G$ or $B$) as defined in equation (1) may then be defined as:

$$C_i = \sum_{j=i}^{N} \phi_j (V_{nj} - V_{(i)j}) \qquad (2)$$

From the above-described properties of the function $\phi_j$ it is clear that the maximum value of $C_i$ is defined as:

$$C_i^{MAX} = \sum_{j=1}^{N} \phi_j (0) \qquad (3)$$

and will occur when the spectral signature $V_n$ in a particular channel "j" is equal to the reference spectral signature $V_{(i)}$ associated with channel "j". Further, it is apparent that a large value of $C_i$ will occur when the spectral signature and reference signature are similar, while a small value of $C_i$ will occur when the spectral signature and reference signatures are dissimilar. Thus, if the three reference signatures $V_{(I)}$ are well separated, then a pixel associated with a ground resolution element having a spectral signature $V_T = V_{(r)}$ would appear red. Similarly, pixels associated with resolution elements having spectral signatures $V_{(T)} = V_{(g)}$ and $V_{(T)} = V_{(b)}$ would appear green and blue, respectively. Further, those pixels associated with resolution elements having spectral signatures made up of proportionate parts of the reference signatures for red, green and blue will appear as separate and distinct colors.

Referring now to FIGS. 5 A–D, examples of possible weighting functions $\phi_j (V_{nj} - V_{(i)j})$ are depicted. The various wave-shapes depicted in FIGS. 5A through 5D may be preselected to determine a preselected range of values for the weighting function. The various wave-shapes shown are typically provided by an external function generator with the particular wave-shape selected to allow interaction between the spectral signature of a resolution element and the associated reference signature to derive specific data values. This interaction provides an instataneous data value $\phi_j$ for each spectral signature $V_{nj}$. To develop $\phi_j$, the reference signature is positioned along the horizontal axis depicted in FIGS. 5A through 5D which represents the data space counts contained in the N-dimensional feature space defining the spectral measurement regions. The reference signature wave-shape is symmetric about a cluster center $V_{(i)j}$ which is located at a preselected data space count and which has a bandwidth defined by the intersections of the wave-shape with the horizontal or data space axis and has a preselected amplitude along the vertical axis depicted in FIGS. 5A through 5D. If a spectral signature $V_{nj}$ has a discrete data space count falling within the bandwidth of the reference signature, a value $\phi_j$ is developed at the point of coincidence of a vertical extension of $V_{nj}$ and the waveshape envelope.

From the above-described interaction it is apparent that the value of $\phi_j$ for identical $V_{nj}$ data space counts will vary according to the particular wave-shape selected. Note in particular that if the wave-shape depicted in FIG. 5B is used, $\phi_j$ can only be one of two possible values, either zero or the maximum preselected amplitude of the weighting function wave-shape.

Accordingly, if N values of $V_{nj}$ are simultaneously compared with N clusters $V_{(i)j}$ to develop a $\phi_j$ value for each of N channels of spectral data and the N simultaneous values of $\phi_j$ are summed, the result will be $C_i$, the correlation function defined in equation (2) or (3), expressed as an analog voltage.

Referring now to FIG. 7A, there is depicted a typical reference signature having a cluster center $V_{(i)j}$ located on the horizontal or data space count axis. Further, a spectral signature $V_{nj}$ is depicted as having a measured data space count greater than the defined bandwidth of the reference signature. Thus, the instantaneous value of $\phi_j$ will be zero. As will be hereinafter described, an operator may interactively shift the cluster center $V_{(i)j}$ along the data space axis as shown in FIGS. 7B through 7D. Further, the operator may also expand or contract the bandwidth of the reference signature to include or exclude the spectral signature $V_{nj}$ so that a desired value $\phi_j$ may be developed.

Referring now to FIG. 6, localized color ranges may be developed by intersecting a plurality of cluster centers so that an actual color region is defined by the intersection of the upper and lower limits of the preselected weighting function wave-shapes. For example, if any one of the wave shapes depicted in FIGS. 5A – 5D is present in two separate channels which are then summed, a circular color region "R" will be defined for correlating the spectral signatures of both channels. Further, if two different wave-shapes such as depicted in FIGS. 5A – 5D are present in separate channels, the summation result could appear as the "G" or "B" regions shown in FIG. 6. Thus, by proper choice of the reference signature wave-shape present in each separate spectral channel, the operator can preselect various color regions of interest to aid in processing the multispectral data.

Referring now to FIG. 1, there is depicted an embodiment of the present invention capable of simultaneously processing four channels of spectral data to develop a color display which may be visually inspected. Assuming the reflectance measurements referred to above are available in a digital format on a computer compatible tape 12, the first step in the processing sequence is to transfer the serially stored data on tape 12 to a storage device 18 having parallel output capability in order that each of the reflectance measurements contained within the four spectral channels may be processed simultaneously. In the present invention, a high speed tape drive recorder/reproducer (R/R) 14 provides an output, in the form of a serial bit-stream of the measurements contained on tape 12, which is coupled into a high speed buffer 16 over a data line 15. High speed buffer 16 provides addressing for each 8-bit data word and transfers the addressed data words to the parallel output storage unit 18 over data line 17. In the present embodiment, a minicomputer having addressing and throughput capability, such as is well known in the art, is utilized as the high speed buffer 16.

Parallel output storage unit 18 comprises a conventional high-speed, 32 track, fixed-head, magnetic disk storage unit. Thus, storage device 18 provides 8 parallel tracks for each spectral channel which can store the 8-bit integer per ground-resolution-element data for each channel. Accordingly, 32 tracks can then store the data for all four spectral channels which make up the multispectral signature of the scanned ground resolution element. As each single track on the magnetic disk contained within storage unit 18 can store up to 250,000 bits, a video display unit 30 having up to a 500 × 500 pixel matrix may be utilized in the present invention. Further, the rotational rate of the disk contained within storage unit 18 is preselected so that data for a complete video frame will be available at the color video display 30 refresh rate.

Thirty two data-bits representing a four channel multi-spectral signature for a given ground resolution element are read from the disk in parallel by 32 fixed-head transducers (not shown) and coupled into the input ports of four parallel input digital-to-analog converters (DAC) 20, 22, 24 and 26 over parallel data lines 21 a–h, 23 a–h, 25 a–h and 27 a–h, respectively. DAC's 20, 22, 24 and 26 convert the 8-bit integers of the digitally formated spectral signature data into four analog voltages which are coupled into an interactive analog processor 28 over analog voltage output lines 29, 31, 33 and 35.

Referring also to FIG. 2, the interactive analog processor 28 contains three identical analog circuits 34, 36 and 38 as will be hereinafter described, which function to develop a signal representative of the proportion of each of the three primary colors (red, green and blue) which are developed to visually represent the spectral signature of each ground resolution element. Each of these analog circuits contain interactive controls which permit an operator to change the classification levels assigned to each ground resolution element in real-time during processing of the data, with the change reflected in a change of color of the video display 30 pixel representative of that ground resolution element.

In the present embodiment, the desired classification map is obtained as a display on the color video display unit 30 which has the color-guns of a CRT 32 interconnected to the processor 28 by drive voltage signal lines 37, 39 and 41, with the signal representative of the proportion of red coupled into the color gun which provides the red color on CRT 32, and with the green and blue signals being similarly coupled into the green and blue color-guns. Additionally, the refresh rate of color video display 30 is synchronized to the video output rate of the storage unit 18 such that the display is refreshed each time the storage unit 18 outputs a preselected video frame. Conventional color video display units 30 are available which provide a 500 × 500 pixel matrix making up a single video frame. Additionally, storage disks capable of storing up to 250,000 bits per track are available for use with storage unit 18. Thus, the multispectral data for an entire video frame comprising a 500 × 500 pixel matrix can be stored in storage unit 18.

Still referring to FIG. 1, interactive controls 40a through 62b, the purposes of which will be hereinafter explained, are shown mounted on color video display unit 30. This mounting location positions the controls proximate to the operator who may easily make desired parameter changes while viewing the CRT 32 display during processing.

Referring now to FIG. 2, there is shown a block diagram of the interactive analog processor 28 of the present invention. The processor 28 contains three identical analog processor circuits 34, 36 and 38, each utilized to process the spectral signatures to provide the color-gun drive voltage signals 37, 39 and 41, that are applied to the color-guns of display 30. Referring also to FIG. 3, each of the processor circuits 34, 36 and 38 are shown to comprise four (4) parallel processing channels. For example, red processor circuit 34 is shown to include four (4) parallel processing channels 40, 42, 44 and 46 with each processing channel interconnected to receive a different analog spectral signal over data lines 29, 31, 33 and 35, applied from each DAC 20, 22, 24 or 26, respectively. Further, the above described interactive controls 40A-62B are interconnected to channels 40 through 62 so that each processor channel, such as 40, is provided with a first manual control, such as 40A which is used to control the data space location of cluster center $V_{(i)j}$ (hereinabove defined) of the reference signature voltage, as will be hereinafter described, and a second manual control, such as 40B, which is utilized to control the bandwidth of the reference signature, again as will be hereinafter described.

Referring now to FIG. 3, there is shown a block diagram of analog processor circuit 34 which is typical of processor circuits 34, 36 and 38, and which illustrates additional details of the four (4) typical parallel analog processor channels within each processor circuit. The description which follows will be limited to a description of one parallel processing channel 40, but the technical explanation applies equally to the operation of all other parallel processing channels of processor circuits 34, 36 and 38.

Still referring to FIG. 3, parallel processor channel 40 includes a two-port differential amplifier 64, having a positive input port interconnected to the analog voltage output from digital to analog converter, DAC 20. The remaining negative port is interconnected to a function generator 106 which acts as a source of the reference signature voltage wave-form which is variable through operation of the reference signature control 40A shown in FIG. 3 as a variable resistor or potentiometer. The combined signal developed at the differential amplifier 64 from the spectral and reference signatures is effectively coupled into a conventional gain amplifier 66 having a variable gain control 40B, also shown as a variable resistor or potentiometer.

The output signal of gain amplifier 66 is applied to a conventional limiting circuit 68 which operates to limit the amplified signal to achieve a signal having a typical wave-shape as shown in FIG. 4A. The signal from limiter circuit 68 is applied to a conventional squaring circuit 70 to achieve a signal having a typical wave-shape as shown in FIG. 4B. The output signal of circuit 70 is then coupled into the negative port of a second differential amplifier 72. A preselected voltage level, shown as V+, is coupled into the positive port of differential amplifier 72 to provide a zero reference level for the amplifier 72 output signal which is shown as a typical output signal as depicted at 4C. The output signal of second differential amplifier 72 is the previously defined $\phi_j$ value and is coupled into a port of a multi-port summation network such as network 74. Since the inputs to network 74 are analog voltage levels, the output will also be an analog voltage level corresponding to the $C_i$ term defined in equations (2) and (3). The output signal, $C_i$, of each summation network of each of the processor circuits 34, 36 and 38 is applied to one of the conventional color-guns of CRT 32 contained within color video display 30.

From the above-description, it is apparent that the spectral signature of a given resolution element in terms of red, green and blue color-gun drive signals which determine the color of each display pixel will be the instantaneous value of the analog voltage signal from each of the three color circuits 34, 36 and 38. Thus, to provide a corresponding visual representation of the spectral signatures on CRT 32, the frame scan of color video display 30 is synchronized to the parallel output of storage unit 18. Any conventional synchronization method, such as providing a separate synchronization track or providing an additional channel which is utilized solely for synchronization, may be used to provide this function.

The above-described operation of processor system 10 relates to processing digitally encoded multi-spectral data to provide a visual representation which may be interpreted by an operator. However, a more important aspect of the present invention is the provision for altering parameters during real-time processing such that the visual representation on CRT 32 may be altered to enhance particular areas of interest to the operator.

Referring now to FIGS. 1, 2, 3, 5A-5D and 7A-7D, the classification level parameters of the multi-spectral data may be altered by interaction between the operator and the reference signature position and gain controls 40A-62B, which are depicted as variable resistors or potentiometers in FIG. 3. Again, utilizing channel 40 for purposes of explanation, changes in the setting of control 40A changes the series resistance provided by control 40A, thereby changing the cluster center $V_{(i)j}$ voltage coupled into first differential amplifier 64. As the $V_{(i)j}$ voltage of the reference signature corresponds to a data space count, a change in the voltage will shift $V_{(i)j}$ along the data space axis to a data space count position corresponding to the new voltage. Assuming, for example, control 40A is changed to decrease the resistance in the variable resistor, then the increased cluster-center voltage coupled into first differential amplifier 64 results in the cluster center $V_{(i)j}$ shifting from a lower data space count to a higher data space count as shown by the shifts depicted in FIGS. 7A-7D. Thus, and now referring to FIGS. 5A-5D, the various wave-shapes present in a particular spectral channel may be positioned at any data space count along the data space axis by operator interaction with that channel's reference signature control.

Referring now to FIGS. 1-3, and 7A-7D, gain control 40B, shown in FIG. 3 as a variable resistor or potentiometer, permits increasing or decreasing the bandwidth about cluster center $V_{(i)j}$. Changing the resistance through operation of control 40B changes the actual gain provided by gain amplifier 66 with a resulting change in the bandwidth. Further, interaction of gain amplifier 66 with the incoming signal merely affects the bandwidth, with the gain amplifier 66 maintaining a constant amplitude on the signal. By way of example, operation of control 40B to increase the resistance in the variable resistor (depicted as 40B) lowers the actual gain provided by gain amplifier 66 with a resulting spread in the bandwidth. As shown in FIGS. 7A-7C, the resistance of control 40B is increased, there is a corresponding spread in the bandwidth about cluster center $V_{(i)j}$. Thus, in FIG. 7 the gain of amplifier 66 is shown decreasing in FIGS. 7A through 7C while the gain is shown increasing over the values depicted in FIGS. 7A through 7C in FIG. 7D. Further, the bandwidth of the various weighting wave-shapes present in the spectral channels, such as depicted in FIGS. 5A through 5D, may be expanded or contracted by operator interaction with gain controls 40B, 42B, 44B and 46B interconnected to the channel in which the weighting wave-shape appears.

Assume that a spectral signature $V_{nj}$ is present in channel 40 as a data space count along the data space line as shown in FIGS. 7A–7D. Operation of control 40A will enable the operator to move the cluster center $V_{(i)j}$ so as to bring the spectral signature within the cluster defined by the bandwidth about the cluster center. Thus, in FIG. 7A the spectral signature $V_{nj}$ is significantly larger than $V_{(i)j}$ and is outside the cluster wave-shape giving a $\phi_j$ of zero for that spectral signature of the ground resolution element and would not be a factor in the output of the summation network 74. In FIG. 7B, the operator has moved the cluster center $V_{(i)j}$ and increased the bandwidth to include the spectral signature $V_{nj}$. The instantaneous value of the output analog voltage $\phi_j$ outputted would be the intersection of the cluster wave-shape with the data space count position of the spectral signature $V_{nj}$ as previously described in connection with FIG. 5. FIGS. 7C and 7D show additional examples of the shifting of cluster center $V_{(i)j}$ along the data space axis to include and exclude the spectral signature $V_{nj}$ within the cluster wave-shape to develop a desired $\phi_j$ during actual processing.

Thus, the operator of the system 10 has the ability to include or exclude specific spectral signatures within a particular color, thereby broadening or narrowing the classification of the visual representation for obtaining broad or narrow classifications, in accordance with predetermined requirements.

The above-described embodiment of the present invention deals specifically with a system 10 capable of handling four channels of spectral data. However, the scope of the present invention is such that any number of channels of spectral data could be simultaneously processed. In the above-described embodiment, the limitation to processing four channels simultaneously is imposed by the parallel output storage device 18. Accordingly, use of a storage device which would permit the simultaneous parallel output of the 8-bit data words for more than four channels would enable the system 10 to be expanded. Such expansion would, of course, require that additional digital-to-analog converters be added as well as additional color processor channels be included in each of the processor circuits 34, 36 and 38.

Further, the above-described embodiment of the present invention assumes that the multispectral data is present in a digital form. It is within the scope of the invention, however, that multispectral data recorded as analog voltage signals recorded in a plurality of parallel channels on an analog tape could be utilized as the data input to processor 28, negating the requirement for the serial-to-parallel and digital-to-analog conversions.

It will be apparent from the foregoing that many other modifications and variations may be made in the apparatus and method depicted herein. Accordingly, it should be clearly understood that the forms and details of the apparatus and technique described herein and depicted in the accompanying drawings are intended as illustrations only, and are not intended as limitations of the scope of the present invention.

What is claimed is:

1. Apparatus for producing color classification maps from multispectral scanner data in which the color classification of the multispectral data can be changed in real-time, comprising:
   a source of a plurality of channels of multispectral data in digital format representative of the reflectance of preselected ground resolution elements,
   transform means for receiving said plurality of channels of multispectral data in digital format and providing a like plurality of analog voltage output signals, a selected instantaneous voltage of each of said signals being representative of a selected spectral signature functionally related to said reflectance of one of said ground resolution elements,
   processor means responsive to said plurality of analog voltage output signals for developing primary color classification signals functionally related to said spectral signatures, said processor means including interactive control means for changing said primary color classification signals to effect a change in the color classification of the visually displayed multispectral data, and
   display means responsive to said primary color classification signals for producing a visual display in map form of said multispectral data.

2. The apparatus described in claim 1, wherein said transform means comprises:
   means for serially receiving said plurality of channels of multispectral data in said digital format and converting said data to a like plurality of channels of multispectral data in a parallel digital format, and
   means for receiving said plurality of channels of said parallel digital data and converting each of said channels of said digital data to an analog voltage output signal.

3. The apparatus described in claim 2, wherein said processor and interactive control means comprises three parallel processing circuits, each of said circuits receiving all of said analog voltage output signals from said transform means for developing a primary color classification signal representative of the proportional value of a primary color to be assigned to said spectral signatures.

4. The apparatus described in claim 3, wherein each of said three parallel processing circuits comprises a plurality of parallel processing channels, each of said plurality of parallel processing channels receiving one of said analog voltage output signals from said transform means and generating an analog color classification signal functionally related to the spectral signatures in one of said plurality of channels of multispectral data.

5. The apparatus described in claim 4, wherein each of said plurality of parallel processing channels comprises:
   at least one signal generating means for generating a preselected analog reference signal representative of a preselected reference signature, each of said preselected reference signals defining a preselected waveshape having a preselected bandwidth symmetrical about a preselected cluster center voltage and having a preselected amplitude, said preselected waveshape cooperating with said selected instantaneous voltage for providing a preselected spectral signature weighting function,
   a differential amplifier receiving one of said plurality of analog voltage output signals from said transform means and said preselected analog reference signal from said at least one signal generating means for generating a first analog signal representative of the difference between said selected instantaneous voltage of one of said analog voltage output signals from said transform means and said preselected cluster center voltage of said preselected analog reference signal, control means interposed between said at least one signal generating means and said differential amplifier for selectively changing the preselected cluster center voltage of said reference signal with respect to said preselected instantaneous voltage for weighting said selected spectral signature, an amplifier for receiving said first analog signal from said differential amplifier, said amplifier having a gain control means for selectively controlling the bandwidth of said first analog signal, means receiving said controlled bandwidth first analog signal output from said amplifier for limiting the amplitude of and squaring said first analog signal and producing a second analog signal, inverting means receiving said second analog signal for inverting said signal and establishing a preselected reference level therefor, wherein said inverted signal output is said analog color classification signal.

6. The apparatus described in claim 5, further including summing means receiving each of said analog color classification signals from each of said inverting means in each of said parallel processing channels in one of said parallel processing circuits for summing said analog signals to provide one of said primary color classification signals.

7. The apparatus described in claim 6, wherein said at least one signal generating means is a function generator.

8. The apparatus described in claim 6 wherein said control means is a manually-operable variable resistance.

9. The apparatus described in claim 6, wherein said gain control means is a manually-operable variable resistance.

10. The apparatus described in claim 3, wherein said display means comprises a color CRT having three primary color-guns each of which receives one of said primary color classification signals from said processor means.

11. Apparatus for producing color classification maps from a plurality of channels of multispectral data representative of the reflectance of preselected ground resolution elements, and in which the color classification of the multispectral data can be changed in real-time, comprising:

transform means for receiving said plurality of channels of multispectral data and providing a like plurality of analog voltage output signals, a selected instantaneous voltage of each of said signals being representative of a selected spectral signature functionally related to said reflectance of one of said ground resolution elements, processor means responsive to said plurality of analog voltage output signals for developing primary color classification signals functionally related to said spectral signatures, said processor means including interactive control means for changing said primary color classification signals to effect a change in the color classification of the visually displayed multispectral data, and display means responsive to said primary color classification signals for producing a visual display in map form of said multispectral data.

12. The apparatus described in claim 11, wherein said transform means comprises:

means for receiving said plurality of channels of multispectral data and generating an analog voltage output signal corresponding to each of said plurality of channels of multispectral data.

13. The apparatus described in claim 12, wherein said multispectral data from said plurality of channels of multispectral data is in digital format, and said transform means further comprises:

means for serially receiving said plurality of channels of multispectral data in said digital format and converting said data to a like plurality of channels of multispectral data in a parallel digital format, and means for receiving said plurality of channels of said parallel digital data and converting each of said channels of said digital data to an analog voltage output signal.

14. The apparatus described in claim 12, wherein said processor and interactive control means comprises three parallel processing circuits, each of said circuits receiving all of said analog voltage output signals from said transform means for developing a primary color classification signal representative of the proportional value of a primary color to be assigned to said spectral signatures.

15. The apparatus described in claim 14, wherein each of said three parallel processing circuits comprises a plurality of parallel processing channels, each of said plurality of parallel processing channels receiving one of said analog voltage output signals from said transform means and generating an analog color classification signal functionally related to the spectral signatures in one of said plurality of channels of multispectral data.

16. The apparatus described in claim 15, wherein each of said plurality of parallel processing channels comprises:

at least one signal generating means for generating a preselected analog reference signal representative of a preselected reference signature each of said preselected reference signals defining a preselected waveshape having a preselected bandwidth symmetrical about a preselected cluster center voltage, and having a preselected amplitude, said preselected waveshape cooperating with said selected instantaneous voltage for providing a preselected spectral signature weighting function, a differential amplifier receiving one of said plurality of analog voltage output signals from said transform means and said preselected analog reference signal from said at least one signal generating means for generating a first analog signal representative of the difference between said preselected instantaneous voltage of one of said analog voltage output signals from said transform means and said preselected cluster center voltage of said preselected analog reference signal, control means interposed between said at least one signal generating means and said differential amplifier for selectively changing the preselected cluster center voltage of said reference signal with respect to said preselected instantaneous voltage for weighting said selected spectral signature, an amplifier for receiving said first analog signal from said differential amplifier, said amplifier having a gain control means for selectively controlling the bandwidth of said first analog signal, means receiving said controlled bandwidth first analog signal output from said amplifier for limiting the amplitude of and squaring said first analog signal and producing a second analog signal, and inverting means receiving said second analog signal for inverting said signal and establishing a preselected reference level therefor, wherein said inverted signal output is said analog color classification signal.

17. The apparatus described in claim 16, further including summing means receiving each of said analog color classification signals from each of said inverting means in each of said parallel processing channels in one of said parallel processing circuits for summing said analog signals to provide one of said primary color classification signals.

18. The apparatus described in claim 16, wherein at least one signal generating means is a function generator.

19. The apparatus described in claim 16, wherein said control means is a manually-operable variable resistance.

20. The apparatus described in claim 16, wherein said gain control means is a manually-operable variable resistance.

21. The apparatus described in claim 17, wherein said display means comprises a color CRT having three primary color-guns, each of which receives one of said primary color classification signals from said summing means.

22. Apparatus for developing primary color classification information for producing color classification maps from a plurality of analog voltage output signals, each of which is representative of one of a plurality of channels of multispectral data functionally related to the reflectance of preselected ground resolution elements, a selected instantaneous voltage of each of said analog voltage output signals being representative of a selected spectral signature functionally related to said reflectance of one of said ground resolution elements, and in which the color classification of the multispectral data can be changed in real-time, comprising:

processor means responsive to said plurality of analog voltage output signals for developing primary color classification signals functionally related to the spectral signatures, said processing means including interactive control means for changing said primary color classification signals to reflect a change in the color classification of the multispectral data.

23. The apparatus described in claim 22, wherein said processor means comprises three parallel processing circuits, each of said circuits receiving all of said analog voltage output signals for developing a primary color classification signal representative of the proportional value of a primary color to be assigned to said spectral signatures.

24. The apparatus described in claim 23, wherein each of said three parallel processing circuits comprises a plurality of parallel processing channels, each of said plurality of parallel processing channels receiving one of the analog voltage output signals and generating an analog color classification signal functionally related to the spectral signatures in one of said plurality of channels of multispectral data.

25. The apparatus described in claim 24, wherein each of said plurality of parallel processing channels comprises:

at least one signal generating means for generating a preselected analog reference signal representative of a preselected reference signature, each of said preselected reference signals defining a preselected waveshape having a preselected bandwidth symmetrical about a preselected cluster center voltage and having a preselected amplitude, said preselected waveshape cooperating with said selected instantaneous voltage for providing a preselected spectral signature weighting function, a differential amplifier receiving one of said plurality of analog voltage output signals and said preselected analog reference signal from said at least one signal generating means for generating a first analog signal representative of the difference between said selected instantaneous voltage of one of said analog voltage output signals and said preselected cluster center voltage of said preselected analog reference signal, control means interposed between said at least one signal generator means and said differential amplifier for selectively changing the preselected cluster center voltage of said reference signal with respect to said preselected instantaneous voltage for weighting said selected spectral signature, an amplifier for receiving said first analog signal from said differential amplifier, said amplifier having a gain control means for selectively controlling the bandwidth of said first analog signal, means receiving said controlled bandwidth first analog signal output from said amplifier for limiting the amplitude of and squaring said first analog signal and producing a second analog signal, and inverting means receiving said second analog signal for inverting said signal and establishing a preselected reference level therefor, wherein said inverted signal output comprises one of the analog color classification signals.

26. The apparatus described in claim 25, further including summing means receiving each of said analog color classification signals from each of said inverting means in each of said parallel processing channels in one of said parallel processing circuits for summing said analog signals to provide one of said primary color classification signals.

27. The apparatus described in claim 25, wherein said at least one signal generating means is a function generator.

28. The apparatus described in claim 25, wherein said control means is a manually-operable variable resistance.

29. The apparatus described in claim 25, wherein gain control means is a manually-operable variable resistance.

30. The apparatus described in claim 26, further including a color CRT having three primary color-guns, each of which received one of said primary color classification signals from said processor means for producing the classification map.

31. A method of producing color classification maps from multispectral scanner data in which the color classification of the multispectral data can be changed in real-time, comprising the following steps, providing a plurality of channels of multispectral data in digital format representative of the reflectance of preselected ground resolution elements, transforming said plurality of channels of multispectral data in digital format to a like plurality of analog voltage output signals, a selected instantaneous voltage of each of said signals being representative of a selected spectral signature functionally related to said reflectance of one of said ground resolution elements, processing said plurality of analog voltage output signals for developing primary color classification signals functionally related to said spectral signatures, converting said primary color classification signals to a visual display in map form of said multispectral data, and interactively changing said primary color classification signals to effect a change in the color classification of the visually displayed multispectral data.

* * * * *